US006639944B1

United States Patent
De Haan et al.

(10) Patent No.: US 6,639,944 B1
(45) Date of Patent: Oct. 28, 2003

(54) SUB-PIXEL ACCURATE MOTION VECTOR ESTIMATION AND MOTION-COMPENSATED INTERPOLATION

(75) Inventors: Gerard De Haan, Eindhoven (NL); Erwin Ben Bellers, Eindhoven (NL); Robert Jan Schutten, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/559,895

(22) Filed: Apr. 26, 2000

(30) Foreign Application Priority Data

Apr. 26, 1999 (EP) .............................. 99201298
Jul. 28, 1999 (EP) ............................. 99202479

(51) Int. Cl.[7] ................................. H04N 7/12
(52) U.S. Cl. .................. 375/240.17; 348/699
(58) Field of Search ................ 348/699, 700, 348/402.1, 407.1, 413.1, 416.1; 375/240.16, 240.17; 382/236, 238; 386/109, 111; 358/261.2, 428

(56) References Cited

U.S. PATENT DOCUMENTS

| 4,873,573 A | * | 10/1989 | Thomas et al. | ........ | 375/240.16 |
| 5,072,293 A | | 12/1991 | de Haan et al. | ............ | 358/105 |
| 5,495,300 A | | 2/1996 | de Haan et al. | ............ | 348/699 |
| 5,565,922 A | * | 10/1996 | Krause | ....................... | 348/699 |
| 5,623,313 A | * | 4/1997 | Naveen | ...................... | 348/416 |
| 5,659,365 A | * | 8/1997 | Wilkinson | ............. | 375/240.01 |
| 5,793,443 A | * | 8/1998 | Aoki et al. | ................. | 348/699 |
| 5,796,437 A | * | 8/1998 | Muraji et al. | ............... | 348/452 |
| 6,020,926 A | * | 2/2000 | Astle | .......................... | 348/416 |
| 6,026,195 A | * | 2/2000 | Eifrig et al. | ................ | 382/236 |
| 6,141,382 A | * | 10/2000 | Krishnamurthy et al. | ..................... | 375/240.17 |
| 6,295,376 B1 | * | 9/2001 | Nakaya | ...................... | 382/236 |
| 6,430,316 B1 | * | 8/2002 | Wilkinson | .................. | 382/236 |

FOREIGN PATENT DOCUMENTS

| DE | 4023449 C1 | 1/1992 | .......... G06F/15/70 |
| EP | 0415491 B1 | 3/1991 | ............. G06T/7/20 |

* cited by examiner

Primary Examiner—Vu Le
(74) Attorney, Agent, or Firm—Edward W. Goodman

(57) ABSTRACT

Sub-pixel accurate motion estimation from digital video requires interpolation of data. In a symmetrical motion estimator that shifts the neighboring images over complementary fractions ($-D/2$, $D/2$) of the vector ($D$), two such interpolating filters are required. In case of block-matching motion estimation algorithms, the match error of various candidate vectors depends on the quality of the sub-pixel interpolation filter(s). As these filters differ per fractional value of the vector, unintentional preferences for some fractional vector values over other may result. The candidate vectors ($D$) are split into an integer part ($Rnd(D/2)$) and a generally non-integer part ($D-Rnd(D/2)$), as this gives a better accuracy and a lower cost than splitting the candidate vectors ($D$) exactly conform the temporal position at which the vectors need to be valid.

7 Claims, 2 Drawing Sheets

SUB-PIXEL ACCURATE MOTION VECTOR ESTIMATION AND MOTION-COMPENSATED INTERPOLATION

BACKGROUND OF THE INVENTION

1. Field of The Invention

The invention relates to methods and devices for sub-pixel accurate motion vector estimation and motion-compensated interpolation or prediction, as well as to a television apparatus comprising such a sub-pixel accurate motion-compensated interpolation device.

2. Description of the Related Art

Motion vectors are used in a range of image processing applications, such as coding, noise reduction, and scan rate conversion. Some of these applications, particularly the scan rate conversion applications, require the true motion of objects to be estimated (see Refs. [1], [2]). Other applications, e.g., coding and interlaced to sequential scan conversion, demand a high accuracy of the motion vectors to realize a low amplitude of remaining coding error, or alias, respectively (see Refs. [3], [4]). Finally there is a category of applications, e.g., consumer applications of motion estimation, where the cost of the motion estimator is of crucial importance (see Ref. [5]).

Several algorithms have been proposed to realize true motion estimation (Refs. [1], [2], [5], [6], [7], and [8]). Also algorithms have been proposed to realize motion estimation at a low complexity level, e.g., Refs. [5], [8], [9], [10] and [11], and apart from the pel-recursive algorithms that usually allow sub-pixel accuracy, see, e.g., Refs. [12], or [13], also a number of block-matching algorithms have been reported that allow the estimation of highly accurate motion vectors (see Refs. [1], [14], and [15]).

In a non-symmetrical motion estimator, it is tried to match a shifted portion of a previous (or next) image to a fixed portion of the present image. If the estimator is a block matcher, its error measure, using the Summed Absolute Difference (SAD) criterion, is:

$$SAD(\underline{C}, \underline{X}, n) = \sum_{x \in B(x)} |F(\underline{x} - \underline{C}(\underline{X}, n), n-1) - F(\underline{x}, n)| \quad (1)$$

where C is the candidate vector under test, X indicates the position of the block B(X), F(x, n) is the luminance signal, and n the picture or image number. The resulting motion vectors describe the velocity of the block in the current image.

In a symmetrical motion estimator, two portions from two (usually successive) images are shifted in opposite direction, again, such that the optimal match results. The match error results as:

$$SAD(\underline{C}, \underline{X}, n) = \sum_{x \in B(x)} |F(\underline{x} - \alpha\underline{C}(\underline{X}, n), n-1) - F(\underline{x}, +(1-\alpha)\underline{C}(\underline{X}, n), n)| \quad (2)$$

The resulting motion vectors (sum of the two shifts, after inverting one of them) describe the velocity of the block in an (not available) image positioned in between the two shifted images. The parameter α, which lies between 0 and 1, determines the temporal position. This type of motion estimator is particularly relevant for frame rate conversion applications.

This disclosure addresses the problem of true-motion estimation with sub-pixel accuracy, where the vectors need to be valid at a point in time that lies between two input pictures (or images). This is particularly relevant for estimators applied in scan rate converters. Sub-pixel accuracy requires the interpolation of pixels at positions between given pixel values. The commonly used method is the so-called bi-linear interpolation, which is attractive for implementation because of its low complexity.

SUMMARY OF THE INVENTION

It is, inter alia, an object of the invention to provide an improved motion vector estimation and motion-compensated interpolation. To this end, the invention provides methods and devices for motion vector estimation and motion-compensated interpolation or prediction.

It is to be noted that in G. de Haan's dissertation "Motion estimation and compensation; An integrated approach to consumer display field rate conversion", Eindhoven 1992, section 8.1.1, a method is described to obtain first and second integer vectors (i.e., having only integer vector components) from an integer candidate vector (i.e., also having only integer vector components), to prevent sub-pixel interpolation for odd candidate vectors. For odd candidate vectors, i.e., a vector having an odd vertical component, a multiplication by a fraction of 0.5 results in a non-integer vector component. For candidate vectors having an even vertical component, there is no problem, as no non-integer value results from multiplying that even vertical component by a fraction of 0.5. This known method includes the steps of multiplying the vector components of the integer candidate vector by a fraction to obtain fractional vector components, rounding the fractional vector components to obtain integer vector components of the first vector, and subtracting the integer first vector from the integer candidate vector to obtain the integer second vector, so that the second vector also has only integer vector components.

In the description and claims, the term "rounding" encompasses both a rounding down (or up) towards the largest smaller (or smallest larger) integer value (i.e., a truncation), and a rounding towards the nearest integer value. The expression "image" encompasses both a field and a frame.

These and other aspects of the invention will be apparent from and elucidated with reference to the embodiments described hereinafter.

DESCRIPTION OF THE PREFERRED EMBODIMENTS

Figure 1:
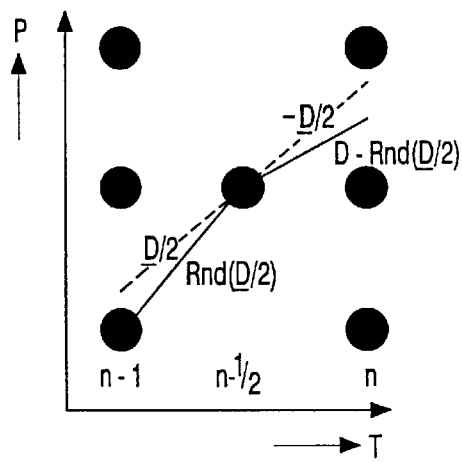
FIG. 1 shows a position versus time diagram of the present invention.

Applicants have found that the straightforward use of the above-mentioned simple bi-linear interpolation algorithm in both neighboring images introduces a rather strong preference for some displacement vectors over others, which can be prevented by using sub-pixel interpolation in one image only, accepting a small but negligible deviation from the intended temporal position at which the vector image should be valid.

The algorithm that Applicants propose resulted from the observation that the stated problem of preferred sub-pixel velocities occurred particularly in case of symmetrical motion estimation. As long as all motion vectors tested lead to integer shifts on the pixel grid, no preferences, unrelated to picture content, for particular motion vectors result. This is different, however, in case sub-pixel interpolation is required. In the symmetrical estimator with bi-linear interpolation, both shifted images that are matched, resulting with the same spectral loss from the interpolating filter. The higher the loss of the interpolating filter for a given fractional velocity, the lower the match error, i.e., a preference for this velocity results. In case of a non-symmetrical motion estimator, only one image is spatially filtered due to the sub-pixel shifting, and, therefore, the higher the loss of a filter, the higher the match error and the lower the preference for this velocity. In both cases, more expensive filters can be applied to reduce unintended preferences.

Experiments have shown that sub-pixel accuracy of true motion sub-pixel motion estimation is better in the asymmetrical configuration than in the symmetrical situation, when using the simplest possible interpolation filters (linear interpolation). With some calculational effort, it could be proven that this had to be expected, by calculating the match error for all interpolation filters for a frequency sweep with gradually changing velocity.

This observation leads to an interesting implementation of a symmetrical motion estimator. The implementation is interesting because it introduces the higher accuracy and the lower cost of the asymmetrical estimator in the symmetrical motion estimator. The invention exists in simply making the estimator symmetrical for the integer part of the motion estimator only, and asymmetrical for the fractional part of the vector. The match error results as:

$$SAD(\underline{C}, \underline{X}, n) = \sum_{x \in B(\underline{x})} \left| F(\underline{x} - \underline{C}_p(\underline{X}, n), n-1) - F(\underline{x} + \underline{C}_n(\underline{X}, n), n) \right| \quad (3)$$

where the relation between the original candidate vector $\underline{C}(\underline{X}, n)$ and $\underline{C}_n(\underline{X}, n)$ pointing to the next image, and $\underline{C}_p(\underline{X}, n)$ and ($\underline{C}_n(\underline{X}, n)$ pointing to the previous image respectively, on the other hand, is given by:

$$\underline{C}_p(\underline{X},n) = (Rnd(\alpha.C_x(\underline{X},n)), Rnd(\alpha.C_y(\underline{X},n)))^T, \underline{C}_n(\underline{X},n) = \underline{C}(X,n) - \underline{C}_p(\underline{X},n) \quad (4)$$

where Rnd(A) returns the nearest integer value for A. As a consequence, $\underline{C}_n(\underline{X}, n)$ contains the fractional part, whereas $\underline{C}_p(\underline{X}, n)$ is an integer vector. Obviously, it is also possible to make $\underline{C}_n$ fully integer and $\underline{C}_p$ the remainder that may have non-integer components. This alternative is within the scope of the claims.

Strictly speaking, the resulting estimate no longer indicates the velocity of the fixed block at the required point in time (in-between two successive images), but should be assigned to a slightly (half the sub-pixel part of the vector at maximum) shifted block, or to the corresponding position in a temporally slightly shifted image. The resulting error, however, is fundamentally very small and is, therefore, negligible.

The advantage of the proposed algorithm is not only an improved accuracy for a motion estimator applying the method, but the implementation can be realized at a lower cost as well. It makes sense, therefore, to not only apply the idea in a motion estimator, but also in a motion-compensated image interpolator. In general, a temporally interpolated image results as:

$$F_i(x, n) = \frac{1}{2}(F(x - \alpha \underline{D}(\underline{X}, n), n-1) + F(x + (1-\alpha)\underline{D}(\underline{X}, n), n)) \quad (5)$$

where $\underline{D}$ is the displacement or motion vector calculated between images n and n−1.

In complete analogy with the proposal from the previous section, we can now modify this to:

$$F_i(\underline{x}, n) = \frac{1}{2}(F(\underline{x} - \underline{D}_p(\underline{X}, n), n-1) + F(\underline{x} + \underline{D}_n(\underline{X}, n), n)) \quad (6)$$

with $$\underline{D}_p(\underline{X},n) = (Rnd(\alpha.D_x(\underline{X},n)), Rnd(\alpha.D_y(\underline{X},n)))^T, \underline{D}_n(\underline{X},n) = \underline{D}(X,n) - \underline{D}_p(\underline{X},n) \quad (7)$$

The advantage again is a cost reduction, since sub-pixel interpolation is required for the pixels from one image only (may also reduce access to memories), while only a very small modification of the temporal instance, at which the image is interpolated, results.

The above-described algorithm for motion compensated interpolation has been shown to be sub-optimal for gradually changing motion vector fields. Because of the rounding of one of the two motion vectors, there will be a discontinuity in the temporal position, for which the combination of the two motion vectors is valid. This discontinuity is clearly visible in the up-converted image, in the case of a gradually changing motion vector field. An adapted version of the original proposal makes these discontinuities smaller. Equation 6 remains as shown above, as does the formula for $D_p$, but the equation for $D_n$ is changed to:

$$\underline{D}_n(\underline{X},n) = (1-\alpha)\underline{D}(\underline{X},n) \quad (8)$$

Note that the sum of vectors $D_p$ and $D_n$ is not equal to D anymore.

The revised algorithm has the same advantages, cost reduction, as the original algorithm, but does not show discontinuities (motion judder) when gradually changing motion vector fields are applied (instead, the resolution may vary per picture, but experimentally, this turned out to be subjectively superior over judder). This revised algorithm is only applied in the case of motion compensated up-conversion, the motion estimation algorithm remains as described above.

FIG. 1 shows a position (P) versus time (T) diagram of the present invention. The column n−1 represents the lines in image n−1, the column n represents the lines in image n, and the dot in column n−½ represents a line to be interpolated. An interrupted line shows that a general sub-pixel accurate vector $\underline{D}$ would result in two half vectors $\underline{D}/2$ each pointing at some position between two existing lines, thus necessitating two non-integer interpolations. In accordance with the invention, one of these half vectors is rounded (Rnd($\underline{D}/2$)) to obtain a vector pointing at an existing line, while the other half vector is obtained by subtracting this rounded first vector Rnd($\underline{D}/2$) from the original sub-pixel accurate vector $\underline{D}$.

Figure 2:
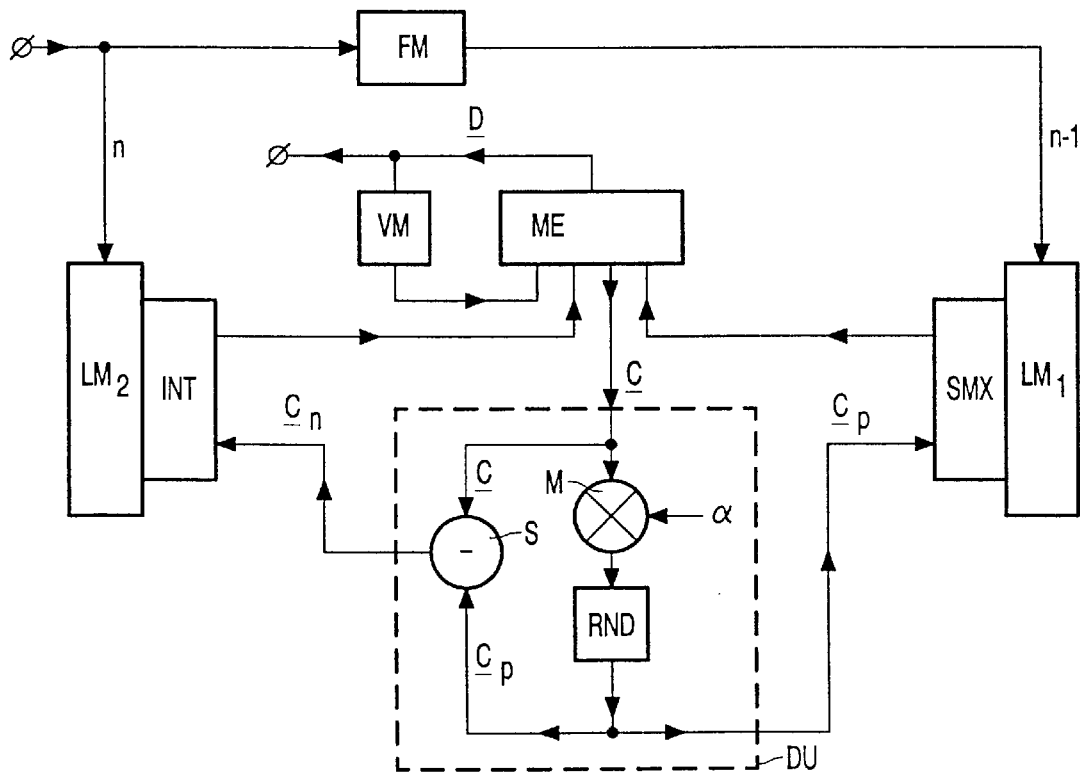
FIG. 2 shows an embodiment of a motion vector estimation device in accordance with the present invention.

FIG. 2 shows an embodiment of a motion vector estimation device in accordance with the present invention. An image memory FM ensures the required temporal delay: image n is present at its input, while image n−1 is present at its output. The embodiment of FIG. 2 further comprises a set of two line memory sections LM1, LM2, each comprising a tapped delay line of, for example, 5 line memories and 16 pixel memories per line memory tap, so that each pixel in a given area can be reached.

FIG. 2 further shows a motion vector estimator ME that communicates with the line memory sections LM1, LM2 through a switch matrix SMX and a position interpolator INT, respectively. In this manner, the motion vector estimator ME furnishes candidate motion vectors C to the line memory sections LM1, LM2, and the line memory sections LM1, LM2 furnish corresponding pixel values to the motion vector estimator ME. As disclosed in European Patent Application EP-A-0,415,491, corresponding to U.S. Pat. No. 5,072,293 (PHN 13,068), the motion vector estimator ME preferably uses also vectors determined for a previous image which are supplied by a motion vector memory VM. The motion estimator furnishes an output vector $\underline{D}$.

In accordance with the present invention, the candidate vector $\underline{C}$ is split up into a fully integer vector $\underline{C}_p$ and a remaining vector $\underline{C}_n$ by a deriving unit DU, the division between $\underline{C}_p$ and $\underline{C}_n$ depending on the fraction $\alpha$. To this end, the candidate motion vector $\underline{C}$ is multiplied by the fraction $\alpha$, the result is applied to a rounding circuit RND that supplies the vector $\underline{C}_p$ that is applied to the switch matrix SMX. The vector $\underline{C}_p$ is subtracted from the candidate motion vector $\underline{C}$ by a subtraction circuit S to obtain the remaining vector $\underline{C}_n$ that is applied to the position interpolator INT.

Figure 3:
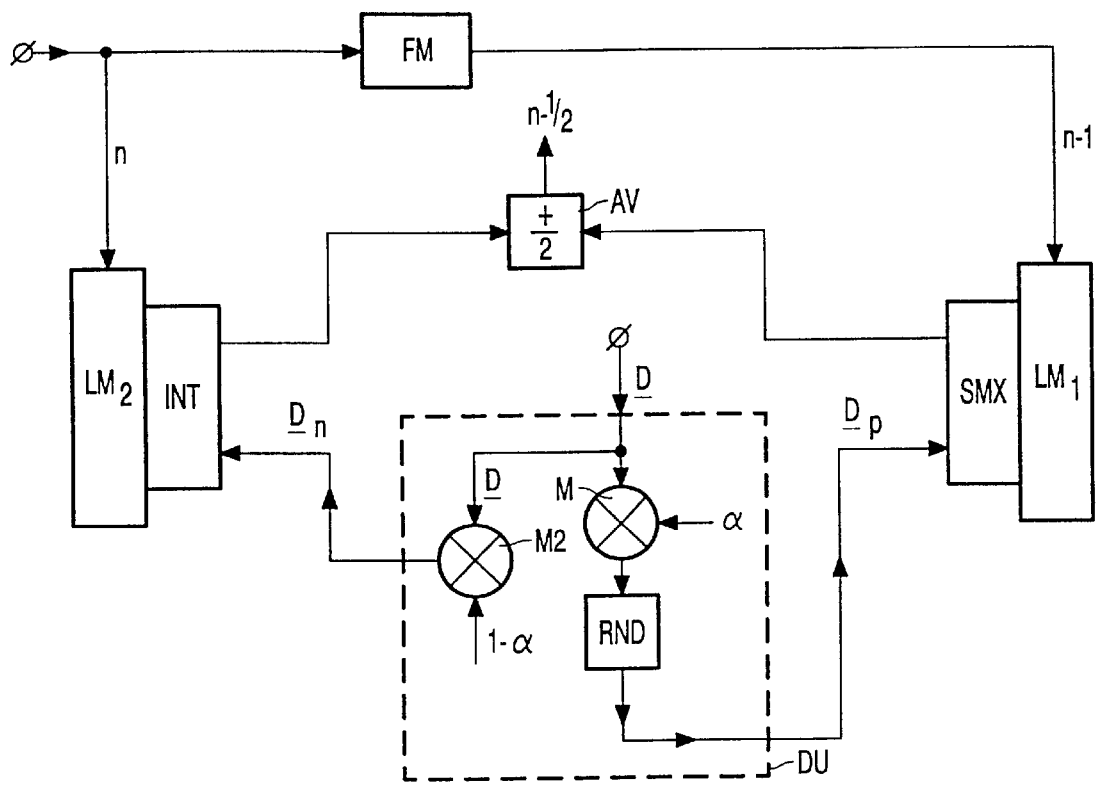
FIG. 3 shows an embodiment of a motion-compensated interpolation device in accordance with the present invention.

FIG. 3 shows an embodiment of a motion-compensated interpolation device in accordance with the present invention. The input motion vector $\underline{D}$ is split up into a fully integer vector $\underline{D}_p$ and a remaining vector $\underline{D}_n$ by the deriving unit DU, according to Equation (6), with $\underline{D}_p$ as in Equation (7) and $\underline{D}_n$ as in Equation (8). The deriving unit DU' of FIG. 3 thus differs from the deriving unit DU of FIG. 2 in that a multiplier M2 multiplies the input motion vector $\underline{D}$ by a factor 1–a to obtain the vector $\underline{D}_n$. The pixel values retrieved from the position interpolator INT and the switch matrix SMX are averaged by an averaging circuit AV to obtain the output image n–½.

Figure 4:
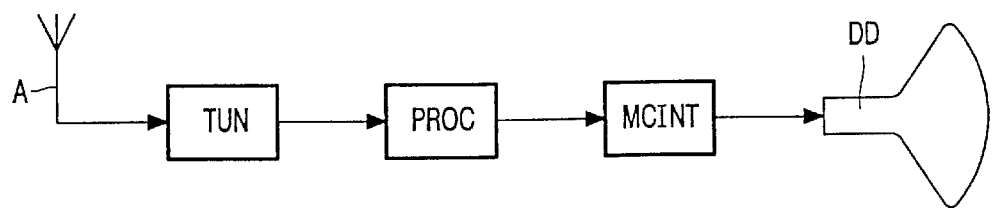
FIG. 4 shows an embodiment of a television apparatus in accordance with the present invention.

FIG. 4 shows an embodiment of a television apparatus in accordance with the present invention. An antenna A supplies a television signal to a tuner TUN that furnishes a video signal to a processor PROC to generate a processed video signal. The number of images in the processed video signal is doubled by a motion compensated interpolator MCINT of the type shown in FIG. 3. The motion-compensated interpolator MCINT may have received its motion vectors $\underline{D}$ from a motion vector estimator of the type shown in FIG. 2. Advantageously, as disclosed in U.S. Pat. No. 5,495,300, the motion vector estimator and the motion-compensated interpolator are combined to form a single circuit.

Primary aspects of the invention can be summarized as follows. Sub-pixel accurate motion estimation from digital video requires interpolation of data. In a symmetrical motion estimator that shifts the neighboring images-over complementary fractions of the vector, two such interpolating filters are required. In case of block-matching motion estimation algorithms, the match error of various candidate vectors depends on the quality of the sub-pixel interpolation filter(s). As these filters differ per fractional value of the vector, unintentional preferences for some fractional vector values over other may result. We propose to split the candidate vectors into an integer part and a generally non-integer part, as this gives a better accuracy and a lower cost than splitting the candidates exactly conform the temporal position at which the vectors need to be valid.

A method and apparatus for estimating motion vectors, or interpolating images, from an image pair, comprises:
    means to generate a first and a second vector from an input vector,
    means to shift pixels from a first image over the first vector, and
    means to shift pixels from a second image over the second vector characterized in that the ratio of the components of the first vector and the input vector depends on the value of these components.

Preferably, the difference of the first and the second vectors equals the input vector. Advantageously, the ratio of the components of the first vector and the input vector approach a fixed factor between 0 and 1 as good as possible, provided that the first vector is only allowed to have integer components, whereas the second vector can have one or more non-integer components.

A method and apparatus for estimating motion vectors, or interpolating an image, from an image pair, comprises:
    means to generate a first and a second vector from an input vector,
    means to shift pixels from a first image over the first vector, and
    means to shift pixels from a second image over the second vector, characterized in that the first vector has only integer components, whereas the second vector can have one or more non-integer components.

It should be noted that the above-mentioned embodiments illustrate rather than limit the invention, and that those skilled in the art will be able to design many alternative embodiments without departing from the scope of the appended claims. FIG. 3 of the first priority application, to wit, European Patent Application No. EP 99201298.9, filed on Apr. 26, 1999, shows an alternative motion-compensated interpolator falling within the scope of the interpolation claims. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware.

REFERENCES

[1] G. A. Thomas, "Television motion measurement for DATV and other applications", BBC Research Report No. BBC RD 1987/11.

[2] R. Thoma and M. Bierling, "Motion Compensating interpolation Considering Covered and Uncovered Background", Image Communications 1, Elseviers 1989, pp. 191–212.

[3] "Time-Recursive Deinterlacing for IDTV and Pyramid Coding", F. M. Wang and D. Anastassiou, Image Communication 2, Elseviers 1990, pp. 365–374.

[4] "A Motion Adaptive De-Interlacing Method", Kwon, Seo, Kim, and Kim, IEEE Tr. on Consumer Electronics, Vol. 38, No.3, 1992.

[5] G. de Haan and H. Huijgen, "Motion Estimation for TV Picture Enhancemene", Proc. 4th Int. Workshop on HDTV and beyond, Torino, 1991.

[6] T. Reuter, "A modified blockmatching algorithm with vector reliability checking and adaptive smoothing", 3h Int. Conf. on Image Processing and its Applications, University of Warwick, England, Jul. 18–20, 1989.

[7] J. Konrad, and E. Dubois "A comparison of stochastic and deterministic solution methods in Bayesian estimation of 2-D motion", Proc. 1" European Conf. on Computer Vision, Antibes, April 1990.

[8] G. de Haan, P. W. A. C Biezen, H. Huijgen, and O. A. Ojo, "True Motion Estimation with 3-D Recursive Search Block-Matching", to be published in IEEE Tr. on Circuits & Systems for Video technology.

[9] R. Srinivasan and K. R. Rao, "Predictive Coding Based on Efficient Motion Estimation", IEEE Tr. on Communication, No. 8, 1985, pp. 888–896.

[10] J. R. Jain and A. K. Jain, "Displacement Measurement and Its Application in Interframe Image Coding", IEEE Tr. on Communications, COM-29, no. 12,1981.

[11] T. Koga, K. Iinuma, A. Hirano, Y. Iilima and T. Ishiguro, "Motion-Compensated Interframe Coding for Video Conferencing", IEEE, Proc. of the NTC 81, G5.3.1., New Orleans La., 1981.

[12] H. G. Musmann, P. Pirsch and J. Grallert, "Advances in picture coding", Proc. of the IEEE, vol. 73, no. 4, April 1985, pp. 523–548.

[13] J. N. Driessen, L. Böröczki and J. Biemond, "Pel-Recursive Motion Field Estimation from Image Sequences", J. on Visual Comm. and Image Representation, 1991.

[14] K. Hildenbrand and J. Mayer, "Method to determine motion vectors for blocks in an image source-sequence" (in German), German Patent No. DE 40 23 449 Cl, 23-01-92.

[15] M. Ziegler, "Hierarchical motion estimation using the phase correlation method in 140 Mbit/s HDTV-coding", Proc. 3th Int. Workshop on HDTV and beyond, Torino, 1989.

What is claimed is:

1. A method of estimating sub-pixel accurate motion vectors between first and second images having a given mutual temporal distance, the sub-pixel accurate motion vectors being intended for use in an interpolation or prediction of an image at a fractional distance from said first image, said fractional distance being a fraction of said given mutual temporal distance, the method comprising the steps:

generating a candidate vector having vector components that may have non-integer values;

deriving first and second vectors from said candidate vector; and evaluating said candidate vector to determine said sub-pixel accurate motion vectors by comparing a first position in said first image shifted over said first vector to a second position in said second image shifted over said second vector; characterized in that said deriving step comprises the steps:

multiplying said vector components of said candidate vector by said fraction to obtain fractional vector components;

rounding said fractional vector components to obtain vector components of said first vector, said first vector having only integer vector components; and subtracting said first vector from said candidate vector to obtain said second vector, whereby said second vector has vector components that, depending on said candidate vector and said fraction, may have non-integer values.

2. A method of generating an intermediate image using sub-pixel accurate motion vectors having vector components that may have non-integer values, from first and second images having a given mutual temporal distance, the intermediate image being at a fractional distance from said first image, said fractional distance being a fraction of said given mutual temporal distance, the method comprising the steps:

deriving first and second vectors from said sub-pixel accurate motion vectors; and generating said intermediate image by combining first positions in said first image shifted over said first vectors and second positions in said second image shifted over said second vectors;

characterized in that said deriving step comprises the steps:

multiplying said vector components of said sub-pixel accurate motion vectors by said fraction to obtain fractional vector components;

rounding said fractional vector components to obtain vector components of said first vectors, said first vectors having only integer vector components; and subtracting said first vector from said candidate vector to obtain said second vector, whereby said second vectors has vector components that, depending on said candidate vector and said fraction, may have non-integer values.

3. The method as claimed in claim 2, wherein said deriving step further comprises the step:

multiplying said sub-pixel accurate motion vectors by a factor equal to 1 minus said fraction to obtain said second vectors.

4. A device for estimating sub-pixel accurate motion vectors between first and second images having a given mutual temporal distance, the sub-pixel accurate motion vectors being intended for use in an interpolation or prediction of an image at a fractional distance from said first image, said fractional distance being a fraction of said given mutual temporal distance, the device comprising:

means for generating a candidate vector having vector components that may have non-integer values;

means for deriving first and second vectors from said candidate vector; and means for evaluating said candidate vector to determine said sub-pixel accurate motion vectors by comparing a first position in said first image shifted over said first vector to a second position in said second image shifted over said second vector;

characterized in that said deriving means comprises:

means for multiplying said vector components of said candidate vector by said fraction to obtain fractional vector components;

means for rounding said fractional vector components to obtain vector components of said first vector, said first vector having only integer vector components; and means for subtracting said first vector from said candidate vector to obtain said second vector, whereby said second vector has vector components that, depending on said candidate vector and said fraction, may have non-integer values.

5. A device for generating an intermediate image using sub-pixel accurate motion vectors having vector components that may have non-integer values, from first and second images having a given mutual temporal distance, the intermediate image being at a fractional distance from said first image, said fractional distance being a fraction of said given mutual temporal distance, the device comprising:

means for deriving first and second vectors from said sub-pixel accurate motion vectors; and means for generating said intermediate image by combining first positions in said first image shifted over said first vectors and second positions in said second image shifted over said second vectors;

characterized in that said deriving means comprises:

means for multiplying said vector components of said sub-pixel accurate motion vectors by said fraction to obtain fractional vector components;

means for rounding said fractional vector components to obtain vector components of said first vectors, said first vectors having only integer vector components; and means for subtracting said first vector from said candidate vector to obtain said second vector, whereby said second vectors has vector components that, depending on said candidate vector and said fraction, may have non-integer values.

6. The device as claimed in claim 5, wherein said deriving means further comprises:

means for multiplying said sub-pixel accurate motion vectors by a factor equal to 1 minus said fraction to obtain said second vectors.

7. A television apparatus, comprising:

means for receiving a television signal;

the generating device as claimed in claim 5, coupled to said receiving means, to obtain a display signal; and means for displaying said display signal.

* * * * *